US 8,813,294 B2

(12) United States Patent
Frigo, Jr.

(10) Patent No.: US 8,813,294 B2
(45) Date of Patent: Aug. 26, 2014

(54) GROUT AND TILE CLEANING IMPLEMENT WITH REPLACEABLE MEMBER

(75) Inventor: Arthur P. Frigo, Jr., Jupiter, FL (US)

(73) Assignee: Clean & Go, LLC, Jupiter, FL (US)

( * ) Notice: Subject to any disclaimer, the term of this patent is extended or adjusted under 35 U.S.C. 154(b) by 362 days.

(21) Appl. No.: 13/226,566

(22) Filed: Sep. 7, 2011

(65) Prior Publication Data

US 2012/0005850 A1    Jan. 12, 2012

Related U.S. Application Data

(63) Continuation-in-part of application No. 12/832,045, filed on Jul. 7, 2010, now abandoned.

(51) Int. Cl.
*A47L 13/16*    (2006.01)
*A47L 13/17*    (2006.01)

(52) U.S. Cl.
USPC ............... 15/104.93; 15/244.1; 15/244.4

(58) Field of Classification Search
USPC .............. 15/105, 118, 104.93, 104.94, 15/244.1–244.2, 244.4
See application file for complete search history.

(56) References Cited

U.S. PATENT DOCUMENTS

| 2,715,745 | A | * | 8/1955 | Jacobsen | 15/121 |
|---|---|---|---|---|---|
| 4,665,580 | A | | 5/1987 | Morris | |
| 4,866,806 | A | | 9/1989 | Bedford | |
| 4,949,417 | A | | 8/1990 | Wertz et al. | |
| 5,187,830 | A | | 2/1993 | Giallourakis | |
| 5,361,445 | A | * | 11/1994 | Giallourakis | 15/118 |
| 6,485,822 | B1 | | 11/2002 | Osiecki et al. | |
| 6,503,615 | B1 | | 1/2003 | Horii et al. | |
| 6,654,981 | B2 | * | 12/2003 | Benson | 15/244.1 |
| 6,857,159 | B1 | | 2/2005 | Strine | |
| 7,060,119 | B1 | | 6/2006 | Haider | |
| 7,210,188 | B1 | * | 5/2007 | Kirby | 15/244.4 |
| 7,454,813 | B2 | | 11/2008 | Kaltenegger | |
| 7,629,043 | B2 | | 12/2009 | Lindsay et al. | |
| 2005/0136238 | A1 | | 6/2005 | Lindsay et al. | |
| 2006/0005338 | A1 | | 1/2006 | Ashe et al. | |
| 2007/0061991 | A1 | | 3/2007 | Gonzales et al. | |

(Continued)

FOREIGN PATENT DOCUMENTS

| JP | 06-098847 A | * | 4/1994 | ............ A47L 13/16 |
|---|---|---|---|---|
| JP | 2002253471 | | 3/2001 | |

OTHER PUBLICATIONS

Stewart, Martha, tip to use bleach and a toothbrush. Martha Stewart Living Television, Internet article, URL: http://www.marthastewart.com/270479/cleaning-the-bathroom, retrieved Jan. 3, 2012.

(Continued)

*Primary Examiner* — Laura C Guidotti
(74) *Attorney, Agent, or Firm* — McHale & Slavin, P.A.

(57) ABSTRACT

The present invention relates to a cleaning implement for cleaning a surface, in particular for cleaning grout or the like textured surfaces. In particular, the instant invention allows for a complete cleaning of a surface with a multi-component cleaning implement having a replaceable melamine member that is held by a supporting member. To allow ease of cleaning, the supporting member further includes an abrasive film and an absorbent sponge allowing the consumer to thoroughly clean with a melamine member yet allow removal of all residual melamine and dirty water by the use of a single all inclusive cleaning implement.

22 Claims, 7 Drawing Sheets

(56) References Cited

U.S. PATENT DOCUMENTS

2007/0157405 A1      7/2007   Bogaerts et al.
2010/0223748 A1      9/2010   Lowe et al.
2010/0313375 A1*   12/2010   Daveloose et al. .......... 15/210.1

OTHER PUBLICATIONS

Anonymous, "How to clean grout", Internet article, URL: http://www.groutcleaningdiy.com.

Anonymous, "Groutrageous professional grout cleaner", Internet article, URL: http://www.thegroutcleaningstore.com/grout-cleaning-products/grout-cleaner.php retrieved Jan. 3, 2012.

Anonymous, "How to: clean grout", Internet article, URL: http://www.realsimple.com/home-organizing/cleaning/bathroom/clean-grout-00000000002255/index.html, retrieved Jan. 3, 2012.

Howard, Mason, "How to clean grout with a dremel", Internet article, URL: http://www.ehow.com/how_6701453_clean-grout-dremel.html, retrieved Jan. 3, 2012.

* cited by examiner

GROUT AND TILE CLEANING IMPLEMENT WITH REPLACEABLE MEMBER

CROSS-REFERENCE TO RELATED APPLICATIONS

This application is a continuation-in-part of U.S. patent application Ser. No. 12/832,045, filed on Jul. 7, 2010, now abandoned the contents of which are incorporated herein by reference.

FIELD OF THE INVENTION

This invention is related to the field of cleaning implements and more particularly to a cleaning implement with a replaceable member inserts.

BACKGROUND OF THE INVENTION

There are numerous cleaning devices that exist in the prior art. Many of which are multi-application in that they may be used on just about any surface although with limited effectiveness. Such cleaning devices may be constructed of a material that allows for multi-application use but lack effectiveness and durability when used on textured or other specialized applications. For example, it is well known that a sponge has very good water retention properties but can quickly wear when used against a textured surface. Further to this example, the various textured surfaces found in a bathroom, highlights the multitude of surfaces that can cause a durability issue with conventional cleaning devices even when used at a single location. While a sponge provides a great benefit in that it is able to retain soap and water, a sponge can further release dirt from an earlier cleaning and the life of the sponge can be quickly shortened if the cleaning surface is textured or includes an unusual build up of gritty dirt. Even a shower has multiple surfaces including smooth tiles as well as textured grout between the tiles. Grout can easily collect bacteria, mold, mildew and other contaminates in the microscopic pores, which resultantly causes a visually unappealing discoloration. While these surfaces can be cleaned with a sponge, a thorough cleaning requires a multitude of cleaning devices capable of handling the various textured and grit embedded surfaces.

The grout found in the tile and/or flooring of a typical bathroom illustrates a difficult surface to clean. Conventional cleaning pads may clean a flat surface but are simply not durable enough and ineffective to handle the grout found in floors, showers and around sinks. The use of a conventional sponge may quickly become a holding area for dirty water. Further, a conventional sponge used on a textured surface is subject to extreme wear and tear. Grout placed within a corner is difficult to clean simply due to the placement. Grout placed between a tile may also be difficult to clean if the tile and grout at different levels. Some known methods of cleaning grout is the use of bleach and a tooth brush. Another known method is the use of Dremel rotary tool. Another known product employs acidic cleaners such as hydrochloric acid. Still other known home remedy combinations include the known use of ammonia & bleach, or ammonia and Comet, either combination of which is capable of releasing a lethal dose of chlorine gas.

Popular cleaning pads include an abrasive surface for addressing the more difficult to clean textured or dirt covered surfaces. Melamine is one such material that includes an abrasive that is effective in the removal of contaminants but in most forms deteriorates and leaves behind a residue. The residue must then be removed by secondary clean-up. Melamine is known to remove unwanted elements without damaging the surface. Despite its ability to efficiently remove unwanted surface elements, it has been found that the length of effective performance is shortened as the melamine wears quickly when moved against a textured surface. As a result, the prior art requires the use of multiple cleaning elements such as sponges, harsh chemicals, abrasive powders, or specialty abrasive members in order to complete a large cleaning job. The prior cleaning implements wear away completely to the point that the cleaning implement itself disintegrates. In large cleaning jobs, the whole implement itself must typically be discarded after a certain amount of use, as the abrasive and/or the absorbent material wears away, perhaps to the point where the cleaning implement itself disintegrates requiring multiple pads to complete the cleaning task.

An additional problem exists when a consumer uses only an abrasive member. The abrasive member may not contain sufficient moisture for lubrication of the surface, resulting in scratches. Use of specialty elements such as melamine causes the consumer to be in direct contact with the element which will likely leave a deposit on the hand of the consumer as it would on the surface of the product. If the consumer's hands are sensitive, direct contact with melamine or other abrasive member may be offensive. Other problems arise because the current cleaning implements do not provide a system capable of accepting various an attachable members, the members being soap pads, bleach pads, melamine pads and the like scrubbing members.

Numerous cleaning implements exist, many of which are patented as implements having an absorbent material, such as a sponge, and/or an abrasive material such as a phenolic or melamine based foam. Examples can be found in U.S. Pat. Nos. 4,665,580; 4,866,806; 4,949,417; 5,187,830; 6,485,822; 6,503,615; 6,857,159; 7,060,119; 7,454,813; 7,629,043 and U.S. Application Publication No. 2005/136238.

U.S. Pat. No. 7,629,043 discloses a cleaning wipe and cleaning product. The cleaning wipe includes a foam layer such as phenolic or melamine based foam that is configured for contacting and cleaning a surface. A reinforcing web is attached to the foam.

U.S. Pat. No. 6,503,615 discloses a wiping cleaner comprising a porous material of an open-cell structure wherein particles are peeled from the wiping surface by friction.

U.S. Publication No. 2007/0157405 discloses a cleaning implement comprising melamine foam and a perfume source, processes for making them and methods for using them.

U.S. Publication No. 2010/0223748 discloses a cleaning pad system for use on a motorized floor cleaning or polishing machine wherein the pad has melamine resin based foam.

U.S. Publication No. 2007/0061991 discloses a cleaning implement suitable for hard surface cleaning comprising heat-compressed melamine foam.

U.S. Publication No. 2006/0005338 discloses a cleaning implement comprising a layer of melamine foam having water-absorbency.

JPO Publication No. 2002/253471 discloses a washing tool that is constituted of a grip having a forked holding part at one end and of a brush part to be held between the forked holding part so as to be attachable/detachable. The brush part is constituted of water absorbing and expanding materials which absorbs water while irreversibly expanding and of the melamine resin foamed body which is held between the water absorbing and expanding materials and is exposed between the materials.

Thus, what is lacking in the art is a complete cleaning element that combines the benefits of a sponge with a specialty cleaning material which has a most beneficial use in cleaning of grout and provides long lasting durability.

SUMMARY OF THE INVENTION

The present invention is a cleaning device having a replaceable insert. The cleaning device is further defined as having an insertable member that may be formed of a melamine wearing material and a core member, which may be composed of a non-absorbent material, having a cavity formed therein that is dimensioned to allow selective removal and reinsertion of the insertable member. Additionally, the insertable member may be formed of an abrasive or a material capable of scrubbing. In an advantageous embodiment, the insertable member may be made from, or may contain, soap or bleach or both. Preferably, the soap may be formed from the combination of an acid, such as fatty acids, and an alkali, such as sodium hydroxide (NaOH). Furthermore, the soap may be contained about the insertable member itself. Preferably, the bleach pad may be formed from sodium hypocholorite, lye, hydrogen peroxide or a peroxide-releasing compound or calcium hypochlorite.

The melamine member may be based on foam having a density of about $$1 \frac{kg}{m^3}$$

to $$9 \frac{kg}{m^2}.$$

The core member may also be comprised on one side of an absorbent material and on the other side of an abrasive, non-scratch material. The cleaning apparatus may further include a holding fastener affixed to the core member and an insertable member fastener affixed to the insertable member to removably secure the insertable member to the core member. The fasteners may be selected from hook and loop fasteners such as VELCRO®, double-sided tape, any other reusable adhesive material or any device capable of fastening the members together.

In particular, the instant invention allows for cleaning a surface with a cleaning implement having melamine securably affixed to an edge of the cleaning implement. The cleaning implement may further include a holding fastener affixed to the core member and an insertable member fastener affixed to the insertable member to removably secure the insertable member to the core member.

It is an objective of the present invention to provide for an improved cleaning implement for cleaning tile, flooring, grout and corners by incorporating a replaceable element of melamine with an absorbent material as well as an abrasive scrubbing side surface.

Still another objective of the instant invention is to provide a self cleaning implement that removes residue that a specialty insert member may leave, such as melamine.

Yet another objective of the instant invention is to provide a cleaning implement capable of withstanding strong forces caused by a user pressing the cleaning implement hard against a textured surface.

It is an objective of the instant invention to provide a cleaning implement capable of holding an insertable member in a protruding edge position; the insertable member may be soap member, bleach pad member, melamine member or like known grout cleaning material.

It is yet a further objective of the instant invention to provide a system such that the receptacle helps to avoid a person's body from coming into contact with the melamine, the melamine residue and the elements which are being cleaned off from a surface.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

These and other details of the present invention will be described in connection with the accompanying drawings, which are furnished only by way of illustration and not in limitation of the invention, and in which drawings.

DETAILED DESCRIPTION OF THE INVENTION

Figure 1:
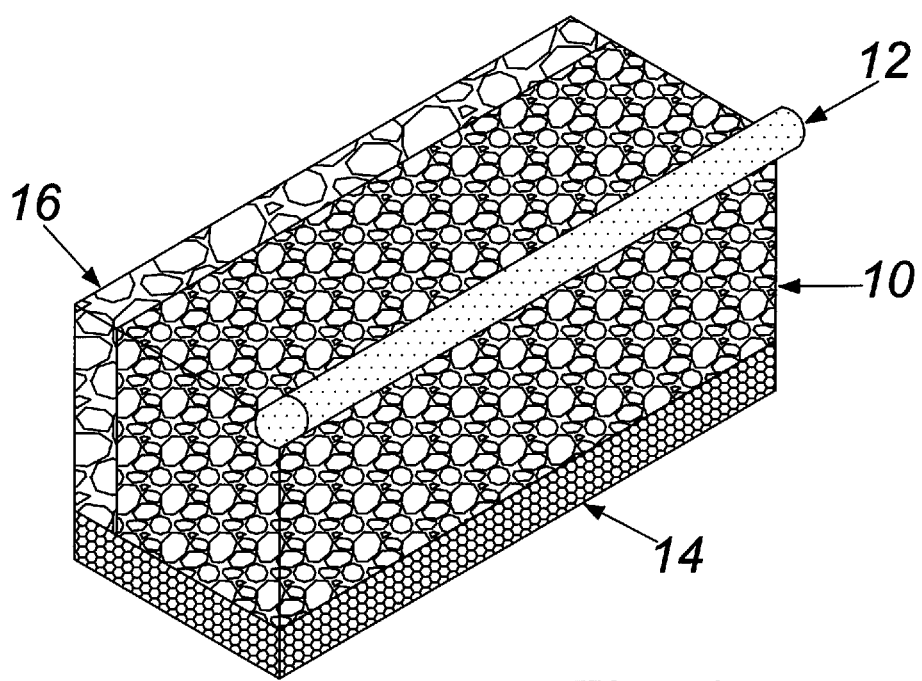
FIG. 1 is perspective view of the cleaning implement.
Figure 2:
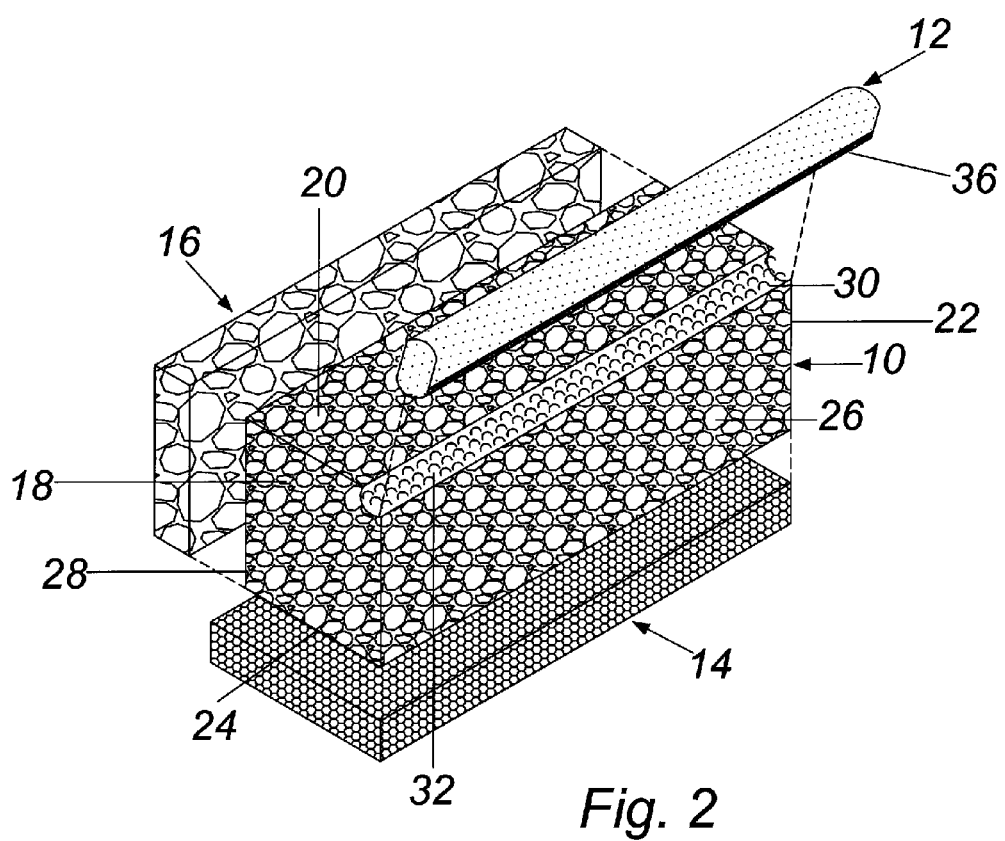
FIG. 2 is an exploded view of FIG. 1.

The present invention relates to an improved cleaning implement that combines the benefits of various cleaning members into a single implement. While the present invention is susceptible of embodiment in various forms, there is shown in the drawings and will hereinafter be described as presently preferred, albeit not limiting, various embodiments with the understanding that the present disclosure is to be considered an exemplification of the invention and is not intended to limit the invention to the specific embodiments illustrated.

Referring now to the Figures, set forth is a cleaning implement comprising a core member 10 of a preferred embodiment formed from firm, dense, non-fluid absorbing foam. The core member has a substantially rectangular block shape with a top portion 20, a bottom portion 24, a first end 18, a second end 22, a rear wall 28 and a front wall 26. A U-shaped receptacle 30 is shaped along the edge between the top portion 20 and the front wall 26, extending from the first end 18 to the second end 22.

The U-shaped receptacle 30 receives a replaceable insertable member 12. The insertable member may be one of a phenolic or melamine foam. Alternative an insertable member may consist of a foam like material that has been saturated with soap, bleach or a member capable of holding a particular surfactant having a specialized use such as removal of contaminants like mold. In the preferred embodiment, the insertable member 12 is a melamine foam that provides an outwardly projection wearing material having a foam density of about $$1\tfrac{\text{kg}}{\text{m}^3} \text{ to } 9\tfrac{\text{kg}}{\text{m}^3}.$$

While not limiting, it has been discovered that using a melamine based foam with about this density provides a significant advantage in that it provides better wear resistance of the material, durability, and improved scrubbing ability, without the material becoming too hard so that it cleans well while remaining flexible and absorbent. The melamine member being an open foam-like material consisting of a formaldehyde-melamine-sodium bisulfate copolymer. The foam is micro-porous with a polymeric substance so that it operates as an extremely fine abrasive material that wears away, like a pencil eraser. The melamine member being abraded as the melamine member scrubs a surface. The insertable member 12 is oblong shaped that allows for ease of attachment to a corner edge as well as reaching into areas that are otherwise difficult to clean, such as the grout beneath a tile surface or the cleaning of an area where two surfaces intersect at right angles and for cleaning long lines of grout.

In one alternative but exemplary embodiment of the invention, the core member 10 can be formed of a fluid absorbing foam that can be moistened and used to maintain the melamine member in a pliable condition by allowing the moisture captured in the core member to saturate the melamine member. The melamine member extends lengthwise from the core member first end 18 to the second end 22, whereby the melamine member 12 includes an engagement portion 36 that can be constructed and arranged to frictionally engage the U-shaped receptacle 30 by frictional engagement. The U-shaped receptacle may also consist of a fastener 32 for removably affixing an insertable member 12. The insertable member 12 may be formed from a corresponding fastener found about the U-shaped receptacle. Alternatively, or in addition, the use of a tack surface can maintain the member insert in a fixed position. Hook and loop fasteners such as VELCRO® or an adhesive allows for ease of removal and replacement wherein the insert can be disposed of and replaced with a new insert member.

The core member 10 secures on its rear wall 28 a first member 16 being one of an absorbent sponge. The first member 16 is preferably secured to the rear wall 28 through lamination but may also be attached by hook and loop fasteners, double-sided tape, or any other adhesive type material capable of fastening the members together, either permanently or temporarily. In a similar format to the insertable member, the use of a replacement member would allow the core member 10 to be maintained as the base and the replacement member exchanged for a material that is more appropriate to the surface, or should the member prematurely wear.

In the preferred embodiment the absorbent sponge may be made from a double celled random pore structure constructed from polyurethane having a high absorbency capable holding of water. The absorbent sponge preferably being constructed from one of double-celled and single-random-celled hydrophilic urethane product and a density between $$1.30 - 2.50 \tfrac{\text{lbs}}{\text{ft}^2}$$

with a tensile strength 16.0 being 10.0 psi minimum, determinable by elongating the sample in a tensile tester until the sample fails. The elongation at failure preferably 190%; 120% minimum. The tear strength preferably 3.0 psi being; 2.0 psi minimum.

The core member 10 secures on its bottom portion 24 to a second member 14 being one of an abrasive film. The second member 14 may also be secured to the bottom portion 24 through lamination but may also be attached by hook and loop fasteners, double-sided tape, or any other adhesive type material capable of fastening the members together, either permanently or temporarily. The abrasive film/scrubbing film is a non-reticulated flexible polyurethane having a extra firm structure. The width of the second member 14 being larger than the core member 10 and extending beyond the core member 10 secures to the edge of the first member 16. The second member 14 may be secured to the edge of the first member 16 through lamination, hook and loop fasteners such as VELCRO®, double-sided tape, any other reusable adhesive material or any device capable of fastening the members together, either permanently or temporarily. An alternative to the flexible polyurethane is the use of a non-woven polyester.

Figure 3:
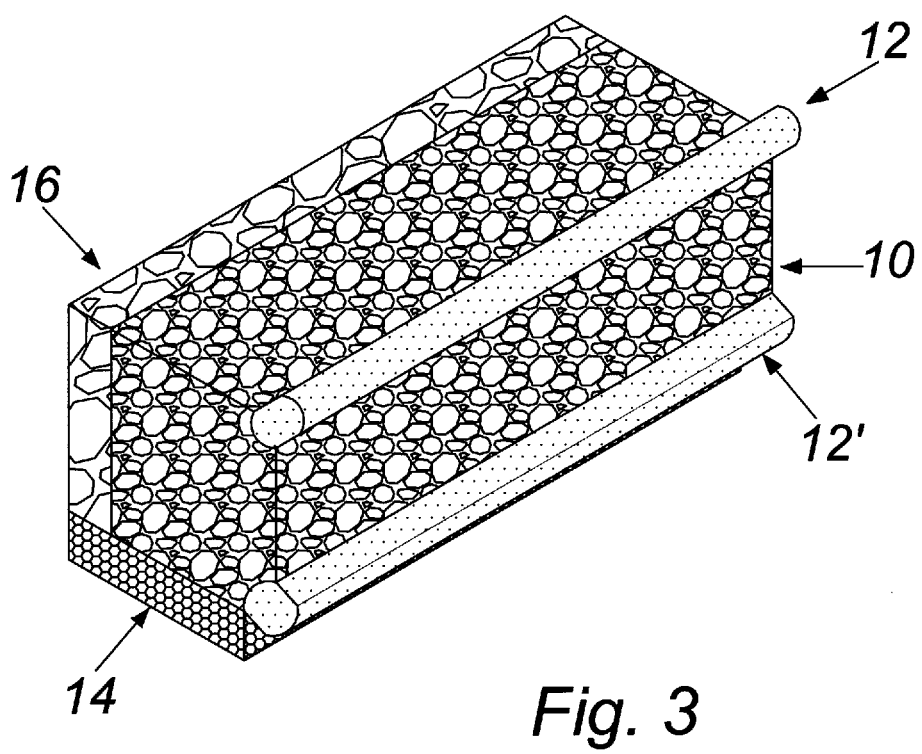
FIG. 3 is a perspective view of the cleaning implement having two insertable members.
Figure 4:
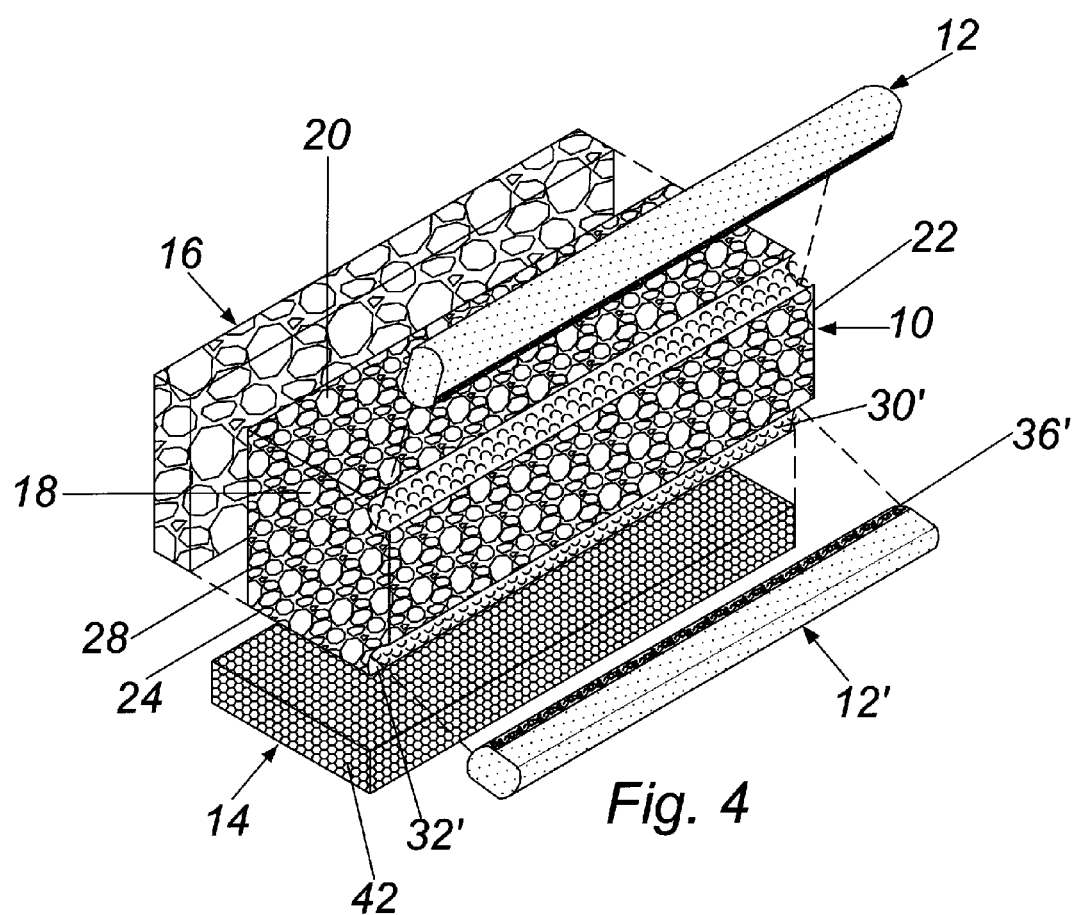
FIG. 4 is an exploded view of FIG. 3.

Now referring to FIGS. 3 & 4, a second U-shaped receptacle 30' can be positioned on the oppose edge of core member 10, constructed and arranged to hold an insertable member 12', the characteristics of the insertable member duplicate member 12, supra. The second U-shaped receptacle having a fastener 32' for removably affixing the insertable member 12'. The insertable member 12' may be formed having a corresponding fastener to the fastener found about the second U-shaped receptacle. The fastener may be selected from hook and loop fasteners such as VELCRO®, double-sided tape, any other reusable adhesive material or any device capable of fastening the members together.

Figure 5:
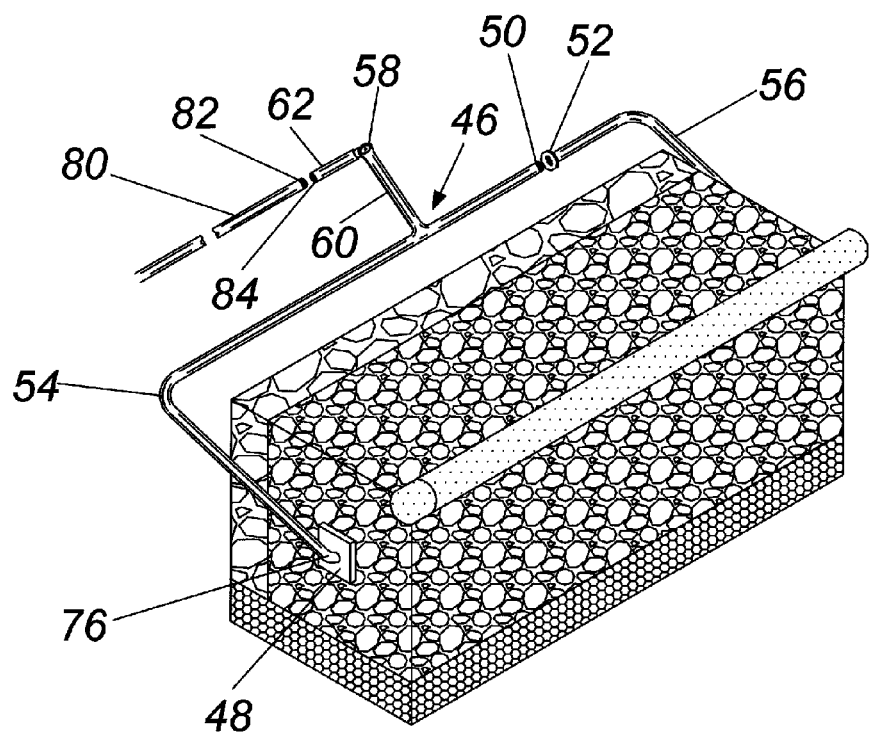
FIG. 5 is front perspective view of the cleaning implement with a handle.
Figure 6:
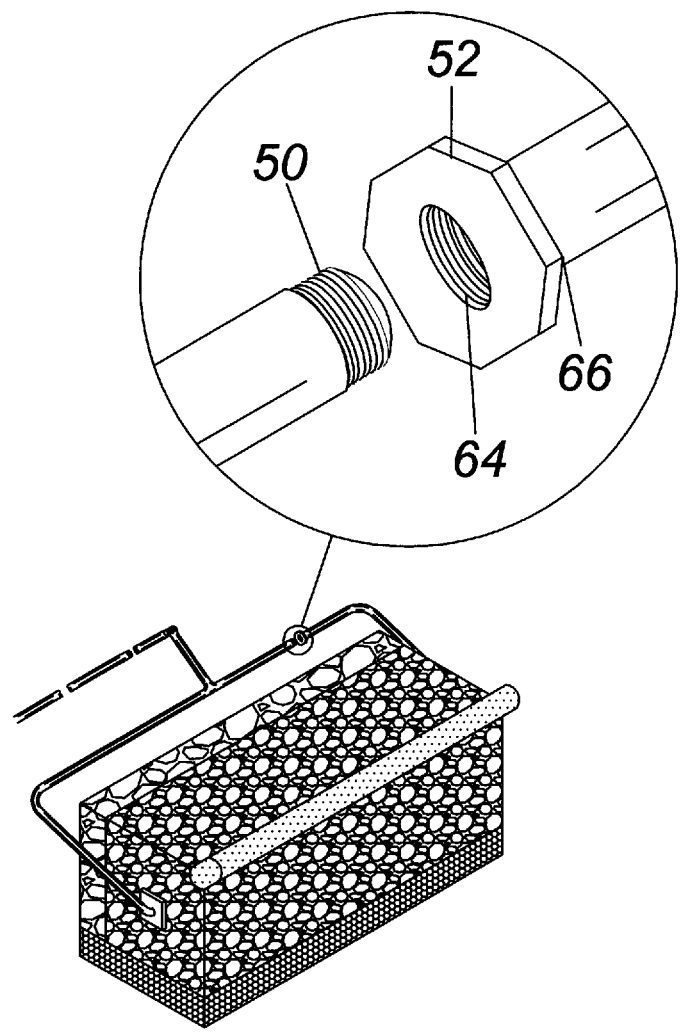
FIG. 6 is front perspective view of the cleaning implement with a handle detailing a securing element.

Now referring to FIGS. 5 & 6, teaches a cleaning implement constructed having a securing bracket 46 to clampingly hold the cleaning implement. The securing bracket 46 being formed of a removable two piece tightening frame including a threaded shaft 50 that fits into a reciprocating threaded nut 52, the reciprocating threaded nut is rotatable about the frame axis, the tightening of the threaded shaft against the threaded inner wall 64 of the threaded nut 66 permits the securing bracket to be held against the first end 18 and second end 22 of the core member 10.

The securing bracket 46 is affixed at a joint 58 by extension 60 permitting movement to a member 62 that accepts a holding member 80 having a threaded shaft 82. The securing bracket 46 has a first portion 54 that is affixed to a first end 76 and holding fixture 48. The securing bracket has a second portion having a second end and holding fixture forming a mirror image of the first end 76 and holding fixture 48. The member 62 has a threaded hole on its inner wall at a distal end 84 from the joint 58. The threaded hole accepts a threaded shaft 82 when rotatably joined. The holding member is constructed and formed to allow a person to grip with their body. Further, the holding member may be moved in a direction to contact the cleaning implement against a surface.

Figure 7:
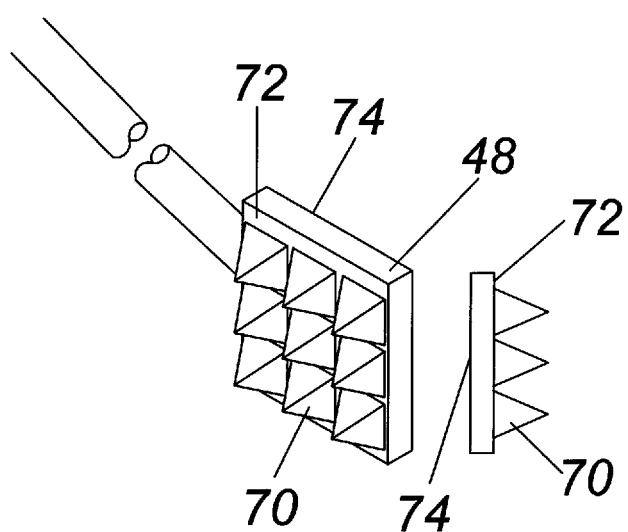
FIG. 7 is a view of a securing element cleat.

The securing bracket is affixed at a first end 76 and a second end, not shown, forming a mirror image of said first end, to a holding fixture 48 attached to mounting surface 74. The holding fixture includes a means of gripping the cleaning implement, by way of an exemplary embodiment seen in FIG. 7, the means for gripping includes a plurality of securing cleats 70 extending from frontal surface 72 of the holding fixture 48 capable of causing frictional tension against the core member 10.

In operation the abrasive film may be used to clean debris from a surface. The melamine having a mild abrasive with exceptional cleaning characteristics for grout and tile, but is known to leave a residual film. Further, the abrasive film is not known for their absorptive characteristics wherein the absorbent sponge is then used to drawn any residual debris from the surface. The core member provides a base that in the preferred embodiment does not include absorbing properties, however, it is to be understood that a core member that is a moisture holding support further allows for lubrication of the various members. The core member providing enhanced cleaning by allowing dirt to be pulled from a surface while maintaining a level of moisture in the various members to prohibit inadvertent scratching of surfaces. If the melamine has any premature wear, the melamine can be replaced thereby indefinitely extending the life of the cleaning implement. It should also be noticed that the position of the abrasive film and the absorbent sponge can be reversed.

It has been discovered that herein described invention provides significantly more efficient and effective cleaning, particularly when used for large cleaning tasks, such as floors, tile, grout and other textured surfaces, or for use with large cleaning areas. These aspects of the invention, singularly and combined, overcome the aforementioned disadvantages of conventional sponges, pads and other described cleaning implements.

It is to be understood that variations and modifications of the various embodiments of the invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A cleaning implement comprising: a core member formed from a dense foam material having a first pore density, said core member shaped by a top, a bottom, front and rear surfaces, and opposing side surfaces, said top and front surfaces adjoining to form an edge positioned first U-shaped receptacle; an absorbent sponge having a second pore density secured to said rear surface of said core member; an abrasive film secured to said bottom surface of said core member; and a first oblong shaped insertable member constructed and arranged to be secured to said U-shaped receptacle; wherein said cleaning implement provides multiple contact surfaces to permit cleaning of multi-textured surfaces.

2. The cleaning implement according to claim 1 including a means for releasably fastening said insertable member to said first U-shaped receptacle.

3. The cleaning implement according to claim 2 wherein said means for releasably fastening said first insertable member is defined as a hook and loop fastener.

4. The cleaning implement according to claim 1 wherein said first insertable member is melamine based foam having a density of about $$1\frac{kg}{m^3} \text{ to } 9\frac{kg}{m^3}.$$

5. The cleaning implement according to claim 1 wherein said first insertable member is foam based material saturated with soap.

6. The cleaning implement according to claim 1 wherein said first insertable member is foam based material saturated with bleach.

7. The cleaning implement according to claim 1 wherein said abrasive film is formed from a non-reticulated polyurethane.

8. The cleaning implement according to claim 1 wherein said abrasive film is formed from a non-woven polyester.

9. The cleaning implement according to claim 1 wherein said absorbent sponge constructed from one of double-celled and single-random-celled hydrophilic urethane product and a density between 1.30-2.50 lbs/ft3.

10. The cleaning implement according to claim 1 further including a second U-shaped receptacle disposed in said core member along an edge formed by said bottom and front surface, said second U-shaped receptacle for receipt of a second oblong shaped insertable member constructed from a material having similar properties to said first insertable member.

11. The cleaning implement according to claim 1 wherein said core member is a non-fluid absorbing foam.

12. The cleaning implement according to claim 1 wherein said core member is a fluid absorbing foam.

13. The cleaning implement according to claim 1 further including:
   a securing bracket formed having a means for affixing to said opposing side surfaces, said securing bracket formed having a joint;
   an elongated forward portion and said securing bracket pivotally joined together at said joint;
   an elongated rearward portion capable of coupling to said forward portion, wherein said elongated rearward position permits gripping.

14. A cleaning implement comprising: a core member formed from a dense foam material, said core member shaped by a top, a bottom, front and rear surfaces, and opposing side surfaces, said top and front surfaces adjoining to form an edge positioned first U-shaped receptacle, said bottom and front surfaces adjoining to form an edge positioned second U-shaped receptacle; an absorbent sponge having a density between 1.30-2.50 lbs/ft3 and constructed from one of double-celled and single-random-celled hydrophilic urethane product secured to said rear surface of said core member; an abrasive film formed from a non-reticulated polyurethane secured to said bottom surface of said core member; and an insertable member constructed and arranged to be releasably secured to each said U-shaped receptacle; wherein said cleaning implement provides multiple contact surfaces to permit cleaning of smooth and multi-textured surfaces with a single implement.

15. The cleaning implement according to claim 14 wherein said insertable member is melamine based foam having a density of about $$1\frac{kg}{m^3} \text{ to } 9\frac{kg}{m^3}.$$

16. The cleaning implement according to claim 14 wherein said insertable member is foam based material saturated with soap.

17. The cleaning implement according to claim 14 wherein said insertable member is foam based material saturated with bleach.

18. The cleaning implement according to claim 14 wherein said insertable member is formed from an abrasive material.

19. The cleaning implement according to claim 14 wherein said insertable member is releasably fastened to each said U-shaped receptacle by a hook and loop fastener.

20. The cleaning implement according to claim 14 wherein said core member is a non-fluid absorbing foam.

21. The cleaning implement according to claim 14 wherein said core member is a fluid absorbing foam.

22. The cleaning implement according to claim 14 further including:
- a securing bracket formed having a means for affixing to said opposing side surfaces, said securing bracket formed having a joint;
- an elongated forward portion and said securing bracket pivotally joined together at said joint;
- an elongated rearward portion capable of coupling to said forward portion, wherein said elongated rearward position permits gripping.

* * * * *